United States Patent [19]

Lin

[11] Patent Number: 4,975,257

[45] Date of Patent: Dec. 4, 1990

[54] LIN'S FLUE GAS DESULFURIZATION PROCESS ACCORDING TO REACTION MECHANISM

[76] Inventor: Ping-Wha Lin, 506 S. Darling St., Angola, Ind. 46703

[21] Appl. No.: 261,376

[22] Filed: Oct. 24, 1988

[51] Int. Cl.$^5$ .......................... B01J 8/00; C01B 17/00; C01F 11/46; G01N 21/00

[52] U.S. Cl. ................................ 423/244; 423/555; 422/62

[58] Field of Search ............... 423/244 A, 244 R, 555; 422/62

[56] References Cited

U.S. PATENT DOCUMENTS

| | | | |
|---|---|---|---|
| 2,718,453 | 9/1955 | Beckman | 423/555 |
| 3,733,777 | 5/1973 | Huntington | 55/48 |
| 3,781,408 | 12/1973 | Lin | 423/244 |
| 3,855,125 | 12/1974 | Lin | 210/46 |
| 3,861,930 | 1/1975 | Lin | 106/109 |
| 4,054,463 | 10/1977 | Lin | 106/97 |
| 4,171,951 | 10/1979 | Lin | 432/77 |
| 4,229,411 | 10/1980 | Wisters et al. | 422/62 |
| 4,293,521 | 10/1981 | Isahaya et al. | 422/62 |
| 4,322,224 | 3/1982 | Roth | 55/20 |
| 4,387,078 | 6/1983 | Lin | 423/244 |
| 4,470,921 | 9/1984 | Lin | 252/189 |
| 4,482,096 | 11/1984 | Lin | 241/65 |
| 4,600,570 | 7/1986 | Lin | 423/244 |
| 4,756,893 | 7/1988 | Lin | 423/244 |

OTHER PUBLICATIONS

"$SO_x$ Removal and Acid Neutralization with its By-Product", by Ping-Wha Lin, Environmental Science and Technology, vol. 12, p. 1081, Sep. 1978.

"Hydration Enhanced Sulfation of Limestone and Dolomite in the Fluidized-Bed Combustion of Coal", by J. A. Shearer et al., APCA Journal, vol. 30, No. 6, Jun. 1980.

*Primary Examiner*—Gregory A. Heller
*Attorney, Agent, or Firm*—Larry J. Palguta

[57] ABSTRACT

The improved flue gas desulfurization process is effective for removing sulfur dioxide in the flue gas with a lime-bearing material in a fluidized lime reactor (50, 110, 164, 426). The effectiveness of the process is due primarily to the presence of sulfur trioxide in the gas, the sulfur trioxide being generated in a catalytic converter (40, 156, 418) and a bypass circuit (20, 408) transmitting a portion of the flue gas past the catalytic converter (40, 418). Sulfur trioxide may also be directly injected by duct injection in order to enhance the removal of sulfur dioxide from flue gas in the fluidized lime reactor (110, 164). In the initial phase, the duct injected sulfur trioxide efficiently raises the temperature of the lime-bearing particles (7) from the exothermic reaction with lime, resulting in the establishment of the steep temperature and sulfur oxides gradients which induce an autogeneous conversion of sulfur dioxide to sulfur trioxide. The converted sulfur trioxide is rapidly removed by the lime-bearing particles (7). Sulfur oxides can also be removed by injecting lime-bearing particles that are considerably hotter than the surrounding gas in the reactor. The improved desulfurization process greatly reduces the capital investment and operating costs of the process, and maintains a high sulfur dioxide removal efficiency while producing a useful by-product.

19 Claims, 4 Drawing Sheets

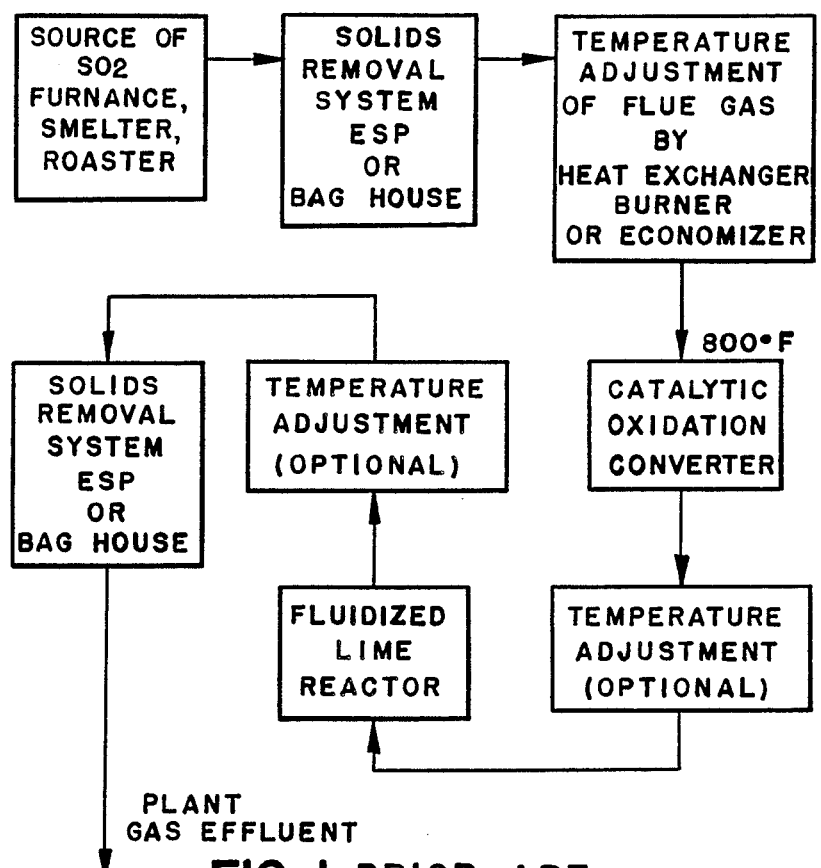
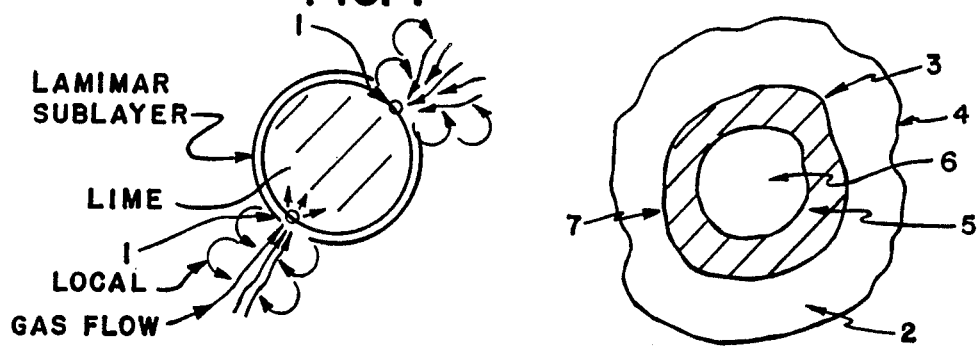
FIG. 1 PRIOR ART
FIG. 1A
FIG. 1B

LIN'S FLUE GAS DESULFURIZATION PROCESS ACCORDING TO REACTION MECHANISM

The present invention relates generally to an improved flue gas desulfurization process, in particular to a process wherein a proportion of the flue gas by-passes a catalytic converter or sulfur trioxide is injected directly for commingling with sulfur dioxide containing flue gas.

BACKGROUND OF THE INVENTION

Referring to FIG. 1, my basic desulfurization process can be described as illustrated therein. Flue gas from fuel-burning furnaces or industrial operations is treated in order to separate solid particles such as fly ash. The gas is then passed to a catalytic converter where a large fraction of the sulfur dioxide in the gas is oxidized into sulfur trioxide. The gas then enters a fluidized lime reactor where the sulfur dioxide/sulfur trioxide mixture is allowed to react with lime particles. The resulting solid material of the dry scrubbing is called "Linfan", the bulk of which can be separated from the gas and recovered as a valuable byproduct. The remaining dust in the exit gas is removed by cyclones or other suitable devices located downstream of the fluid bed reactor. The final gaseous effluent leaving the desulfurization process is essentially free of dust and sulfur oxides.

The solid byproduct ("Linfan") contains lime in its central core surrounded by an outer cracked shell of anhydrous calcium sulfate ($CaSO_4$). Unlike other byproduct generated in dry processes, this outer shell has numerous micropores (very fine cracks) which are actually unique to my process. This byproduct has been shown to be useful for construction materials, chemicals for water and waste-water treatment, or even as a sorbent for sulfur dioxide scrubbing processes.

Since my desulfurization process involves a catalytic oxidation conversion as a gas preconditioning step, concerns have been raised regarding any potential operational problems. As far as solids removal and catalytic conversion are concerned, my desulfurization process is similar to Monsanto's Cat-Ox process. The article entitled *The Final Report, Demonstration/Evaluation of the Cat-Ox Flue Gas Desulfurization*, EPA-600/2-78-063 states the result of using vanadium pentoxide as a catalyst. It shows that: (1) flue gas has no poisoning effect on the vanadium pentoxide catalyst, (2) fly ash build-up has little affect on the conversion efficiency of the catalyst, and (3) the catalyst bed can be cleaned on a continuous basis, e.g., the catalyst may be shifted once every three months to minimize pressure drops across the bed.

The effort to develop my desulfurization process was first initiated in the early 1970's. The invention has been patented and reports describing various aspects of this process have been issued. The report published by the national Technical Information Services (NTIS) and entitled "*Project on Sulfur Dioxide Removal and Waste Products Utilization Process*", DOE/CE/15143-T1 (DE 84017333) contains information on the test results from a pilot plant operation of my process. Table 1 prepared from the information in that report is listed below.

TABLE 1

Test Results of SOx Removal by Lime in the Fluidized Lime Reactor of Lin's Desulfurization Process

| Reactor Temperature °F. | SOx Conc.* Reactor Inlet (ppm) | SO₂ Conc. Reactor Inlet (ppm) | SO₂ Conc. Reactor Outlet (ppm) | SO₂/SO₃ Ratio at Inlet | SOx Removal Efficiency (%) |
|---|---|---|---|---|---|
| 652 | 5000 | 2200 | 200 | 0.44 | 96 |
| 505 | 10000 | 500 | 0 | 0.05 | 100 |
| 709 | 20000 | 5400 | 200 | 0.27 | 99 |
| 540 | 10000 | 500 | 0 | 0.05 | 100 |
| 740 | 20000 | 1400 | 0 | 0.07 | 100 |
| 590 | 10000 | 4500 | 200 | 0.45 | 98 |
| 672 | 10000 | 4400 | 150 | 0.44 | 98.5 |
| 831 | 10000 | 500 | 0 | 0.05 | 100 |
| 739 | 5000 | 250 | 0 | 0.05 | 100 |
| 905 | 5000 | 200 | 0 | 0.05 | 100 |

*No $SO_3$ was detected at reactor outlet.

From the results contained in Table 1, it can be concluded that the desulfurization process is effective in removing nearly 100% of sulfur oxides from flue gas at temperatures ranging from 500° F. to 900° F., that sulfur oxide can be effectively removed by lime when sulfur trioxide is present in the flue gas, and that sulfur dioxide can be effectively removed by lime at a temperature as low as 505° F. (263° C.) when sulfur trioxide is present in the flue gas.

I have now determined that the effectiveness of my desulfurization process in removing sulfur dioxide from flue gas is largely due to the presence of sulfur trioxide in the gas. The $SO_x$ removal mechanism in my desulfurization process can be explained in the following manner. As the flue gas leaves the catalytic oxidation convertor, $SO_2$ and $SO_3$ in the gas are in equilibrium in accordance with the equation:

$$SO_2 + \tfrac{1}{2}O_2 \rightleftharpoons SO_3 \tag{1}$$

However, after the flue gas containing sulfur dioxide and sulfur trioxide enters the lime reactor (located downstream of the catalytic converter), sulfur trioxide immediately reacts with lime (CaO) to form anhydrous calcium sulfate ($CaSO_4$) according to the following formula:

$$SO_3 + CaO \rightarrow CaSO_4, \ \Delta H = -9.26 \ K \ cal/mole \tag{2}$$

This reaction is highly irreversible since the dissociation temperature of $CaSO_4$ is known to be very high, about 2300° F. Also, because the large amount of heat generated from the chemical reaction is rapidly dissipated in a fluidized environment, the reaction in equation (2) is enhanced. As a result of the rapid removal of sulfur trioxide, the equilibrium of equation (1) is destroyed, and the reaction direction is shifted completely to the right. Therefore, sulfur trioxide and $CaSO_4$ are formed at an unusual speed:

$$SO_2 + \tfrac{1}{2}O_2 \rightarrow SO_3 \tag{3}$$

$$SO_3 + CaO \rightarrow CaSO_4 \tag{2}$$

The reaction rate of equation (3) depends on oxygen concentration and the temperature of the flue gas. The higher the temperature of the reactor environment, the faster the reaction rate. Also, the higher the oxygen concentration of the flue gas, the faster the conversion rate. The reaction rate for sulfur trioxide formation under normal conditions can be calculated as follows:

$$d[SO_3]/dt = k_1[O][M]\{[St] - [SO_3]\} - \{k_2[O][M] + k_3[H]\}[SO_3] \quad (4)$$

where
[O] is oxygen concentration
[M] is background molecular concentration
[St] is total sulfur oxides concentration Because sulfur trioxide reacts rapidly with calcium oxide to form $CaSO_4$ in my desulfurization system, the sulfur trioxide in the second term of the equation (4) can be treated as zero and the $[SO_2]$ can be treated as [St] in the gas immediately surrounding the lime particle, the above equation becomes:

$$d[SO_3]/dt = k_1[SO_2][O][M] \quad (5)$$

Westenberg and de Hass (*J. Chem. Phys.*, 63, 5411–5415, 1975) recommended a rate coefficient of $$k_1 = 8.0 \times 10^4 e^{-1400/T} m^6 mol^{-2} s^{-1} \quad (6)$$

The value of $K_1$ in equation (6) was determined under controlled laboratory conditions, i.e., homogeneous and steady state; the influencing factors such as fluidization, gas convection, and heat generated from the exothermic reactions, being important in my desulfurization system, were not included, as considerations. It is obvious that the conversion rate of $SO_2$ to $SO_3$ in my system is much faster than that predicted by equation (6). Therefore, the reaction rate values derived from equation (6) can only serve as a reference for my reaction mechanism.

From equations (4) and (5), it can be seen that the rate of $SO_2$ conversion to $SO_3$ in my desulfurization system is affected by oxygen concentration, background molecular concentration, $SO_2$ concentration, and rate coefficient $k_1$ which is a function of temperature. If the reaction time in the reactor is sufficiently long, all of the $SO_2$ can be changed to $SO_3$ which reacts in turn instantly with CaO and is removed from the flue gas. In reality, the reaction time in the lime reactor is very short, being a fraction of second or seconds.

In the lime reactor, the background molecular concentration is not affected by the chemical reactions. For gas with low $SO_2$ concentration such as in a power plant, the reduction of oxygen concentration for desulfurization of the flue gas is not significant. Therefore, the $SO_2$ conversion rate is mainly determined by rate coefficient $k_1$ or temperature.

The average gas temperature of the fluidized lime reactor in my system, for economic reasons, is relatively low as compared with other processes. The reason why my process has such high SOx removal efficiency can be explained as follows: In a fluidized reactor environment, the lime particle is surrounded by a boundary layer which consists of a laminar sublayer. Referring to FIG. 1A, as an $SO_3$ molecule reacts with lime at the points of reaction 1, a large quantity of heat in the amount of 92.3 k-cal/mole is generated. According to calculations based on an average heat capacity of the reactant lime-bearing material of 0.26 cal/gm/° C, if there is no heat transfer, the temperature at reaction points 1 is increased instantly by 2610° C. or 4730° F. Actually, the heat generated is transmitted immediately to the other part of the solid particle and to the surrounding gas. Since the heat transmission through the solid is relatively slow, there is a gradual temperature increase of the lime-bearing particle until thermal balance of the particle is attained. In a fluidized environment most of the heat is rapidly transmitted to the surrounding gas mainly by radiation and convection. Instantly, there is a sharp gas thermal gradient which induces violet turbulence of the gas flow on the surface of the lime particle. Thus, the boundary layer including the laminar sublayer of the particle is temporarily modified or destroyed. Because of the thermal induced turbulence and gas diffusion, more SOx is brought in contact with lime, and further reaction is enhanced.

When $SO_3$ concentration of the flue gas in the reactor is high, the chemical reaction between lime and $SO_3$ takes place continuously on the general surface of the lime-bearing particle. As a result, a layer of $CaSO_4$ coating is formed on the surface of the lime-bearing particle. Subsequently, $SO_3$ must diffuse through the $CaSO_4$ coating in order to react with the lime in the core of the particle. The heat generated from the reaction will result in a violent convective turbulence on the whole surface of the particle. It can be visualized that the lime bearing particle 7 is surrounded by a chemically reacting gas layer 2 as shown in FIG. 1B. The chemically reacting layer 2 has a thin thickness and a sharp temperature gradient, ranging from high temperature at gas/solid interface 3 to about 1000° F. at the edge of the layer 4. The maximum temperature at gas/solid interface 3 can be as high as 2300° F., the dissociate temperature of $CaSO_4$. The high gas temperature and gas turbulence near the interface 3 cause an increase in the kinetic energy of the gas molecules and high frequency of molecular collision. Consequently, the $SO_2$ molecules are activated and rapidly oxidized to $SO_3$. The newly formed $SO_3$ also diffuses through the $CaSO_4$ coating, reacts with lime 6 and contributes to the formation of $CaSO_4$ coating 5 on the lime-bearing particle 7. In the mean time, because of the high temperature gradient of the chemically reacting layer 2, the relatively cold gases in the reactor are drawn into the layer and forced rapidly toward gas/solid interface 3. As $SO_3$ in the gas is continuously diffused through the $CaSO_4$ coating and removed by lime 6 in the lime-bearing particle, there exists an SOx concentration gradient in the chemically reacting layer 2. The SOx concentration gradient further induces SOx diffusion in the layer 2. Obviously, the movement of SOx molecules in the chemically reacting layer is very fast and its general direction is toward the lime-bearing particle. The characteristics of the chemically reacting gas layer 2 are that the reaction rate is non-equilibrium, the flow is turbulent, unsteady and three dimensional, and the condition is non-homogeneous.

The $SO_3$ at gas/solid interface continuously diffuses through the $CaSO_4$ coating and reacts with lime at the core of the lime-bearing particle 7. The diffusion rate of sulfur trioxide in $CaSO_4$ coating is dependent on the temperature of the lime-bearing particle 7. On account of the highly exothermic reaction between sulfur trioxide and lime, the temperature of the lime bearing particle 7 gradually increases to a steady high level at which the heat released from further chemical reaction just balances with the heat dissipated to the fluidized reactor environment. The final steady temperature level of the lime bearing particle 7 as a whole increases with the SOx concentration of the influent flue gas and the average gas temperature of the reactor environment. It is understood that the higher the temperature of the lime-bearing particle, the higher the lime utilization efficiency, as long as the temperature does not exceed the dissociate temperature of CaSO4. Since the formation of CaSO4 in a Linfan particle takes place at very high temperature on account of the exothermic reaction, the CaSO4 is hard burned anhydrous CaSO4 (a new material).

The SOx removal efficiency of my process depends on several factors, namely, original SO3 concentration of the flue gas just before entering the fluidized lime reactor, the average gas temperature in the reactor, and residence time or reaction time of the gas in the reactor. For practical considerations, the reaction time in the lime reactor varies from ½ second to 10 seconds, the superficial velocity of the flue gas in the reactor is in the range from 1 foot per second to 80 feet per second, and the SO2/SOx ratio can be more than 50%.

Flue gas contains water, therefore, the following reactions also take place:

$$SO_2 + \tfrac{1}{2}O_2 \rightleftarrows SO_3 \tag{1}$$

$$SO_3 + H_2O \rightarrow H_2SO_4 \tag{9}$$

The formation of H2SO4 vapor in equation (9) removes SO3 from the flue gas, and thus, causes equation (1) to shift to the right direction, resulting in more SO3 production in the flue gas. Equation (9) is not significant in a high temperature environment. As the H2SO4 vapor containing gas diffuses into chemically reacting layer 2 of the lime-bearing particle 7 (see FIG. 1B), the high temperature of the gas near the gas/solid interface 3 causes the H2SO4 vapor to dissociate to SO3 and H2O vapor. The SO3 molecules are removed immediately by the lime in the lime-bearing particle according to the following formula:

$$H_2SO_4 \rightarrow SO_3 + H_2O \tag{10}$$

$$SO_3 + CaO \rightarrow CaSO_4 \tag{2}$$

From equations (1), (9), (10), and (2), it is apparent that water vapor in flue gas can serve as a catalyst in the conversion of SO2 to SO3 in Lin's flue gas desulfurization process.

Flue gas may contain carbon dioxide, and the following reactions also take place in the fluidized reactor:

$$CO_2 + CaO \rightarrow CaCO_3 \tag{7}$$

$$SO_2 + \tfrac{1}{2}O_2 \rightarrow SO_3 \tag{2}$$

$$SO_3 + CaO \rightarrow CaSO_4 \tag{3}$$

$$SO_3 + CaCO_3 \rightarrow CaSO_4 + CO_2 \tag{8}$$

In a fluidizing environment, equations (2), (3), (7) and (8) are irreversible reactions in my desulfurization process. Obviously, sulfur dioxide is continuously and effectively removed from the flue gas, and the resulting product of the desulfurization is mainly CaSO4. The reaction rates of equation (2), (3) and (8) are very fast in my process. Experience shows that either bubbling or circulating fluidize lime reactors can be employed for the effective removal of sulfur dioxide.

It should be pointed out that although a direct reaction between sulfur dioxide and calcium oxide may appear to be possible, this reaction has been shown to be absent in my desulfurization process. This fact can be explained by the findings of basic sulfur dioxide/calcium oxide reactions by Boyton and Chan et al.

Boyton in his book *Chemistry and Technology of Lime and Limestone, Intersciences*, states that adsorption of sulfur dioxide by lime occurs at a temperature between 300° C. and 400° C. At a temperature above 400° C., sulfur dioxide reacts rapidly with lime to form CaSO3 according to the formula:

$$SO_2 + CaO \rightarrow CaSO_3$$

At a higher temperature, the resulting products from the chemical reaction between lime and sulfur dioxide are CaSO4, CaSO3, and CaS. According to Chan et al in *Thermogravimetric Analysis of Ontario Limestones and Dolomites*, and in *Reactivity of Sulfur Dioxide with Calcined Samples*, by R.K. Chan et al., *Canadian Journal of Chemistry*, Vol. 48, No. 19, 1970, the extent of these three products depends on the reaction temperature.

There is no evidence that direct reaction between sulfur dioxide and calcium oxide takes place when sulfur trioxide is present in the lime reactor. A recent analysis of the resulting product of the desulfurization from a fluidized lime reactor shows that the product does not contain any trace of CaSO3 and CaS. The fact that CaSO3 and CaS are absent in the resulting product is an indication that direct reaction between sulfur dioxide and calcium oxide does not take place. Furthermore, as shown in Table 1, even at a reactor temperature as low as 500° F. (263° C.), sulfur dioxide can be removed effectively by lime. At such a low temperature, according to Boyton, there is simply no direct reaction between sulfur dioxide and calcium oxide. This is an indication that the reaction of my desulfurization process is mainly due to the presence of sulfur trioxide so that sulfur dioxide is facilitated in its conversion to sulfur trioxide for reaction with calcium oxide as explained by the aforementioned reaction mechanism.

Apparently, the resulting product of my desulfurization process contains only unspent lime and anhydrous CaSO4 which is produced from a reaction between sulfur trioxide and calcium oxide. Because it is relatively pure, it has commercial value.

SUMMARY OF THE INVENTION

An improved process for effecting the efficient desulfurization of gases containing sulfur oxides comprises the steps of:

passing a flow of flue gas containing sulfur oxides gases to solids removal means in order to remove solids therefrom, transmitting the flue gas to junction means where a predetermined amount of the flue gas continues through a first circuit and the remaining portion of the flue gas passes through a second circuit, transmitting the flue gas in the first circuit through heat exchanging means in order to increase the temperature thereof, passing the heated flue gas in the first circuit through catalytic converter means in order to convert the sulfur dioxide therein to sulfur trioxide and resulting in a sulfur trioxide rich flue gas, communicating the flue gas in the second circuit means to second junction means located downstream the catalytic converter means wherein the flue gas is joined with the sulfur trioxide rich flue gas to provide a mixed flue gas, communicating the mixed flue gas to a reactor and providing a reactant to the reactor, continuously emitting a desulfurized exit gas from the reactor to solids separation means, and transmitting said desulfurized exit gas to an exit.

An alternative improved process for effecting the efficient desulfurization of gases containing sulfur oxides comprises the steps of:

transmitting flue gas containing sulfur oxides gases through junction means which receives a gas containing sulfur trioxide that is mixed at the junction means with the flue gas containing sulfur oxide gases, passing the mixed gases to a reactor and providing a reactant to the reactor, withdrawing the reaction product of the reactant and sulfur oxides, quenching said reaction product to effect a porous core of unreacted reactant in an outer shell and to induce cracks in the outer shell, continuously emitting a desulfurized exit gas from said reactor, and transmitting said desulfurized exit gas to an exit.

BRIEF DESCRIPTION OF THE DRAWINGS

FIG. 1 illustrates generally my prior processes for effecting desulfurization;

FIG. 1A illustrates the chemical reaction at points on the surface of a lime-bearing material;

FIG. 1B is a graphical representation of the desulfurization reaction mechanism;

DETAILED DESCRIPTION OF THE INVENTION

Several improvements in my desulfurization process have been made in light of the chemical reaction mechanisms described above, and they can be exemplified as follows:

1. By-passing a Fraction of Flue Gas Past the Catalytic Oxidation Converter

Figures 2, 3:
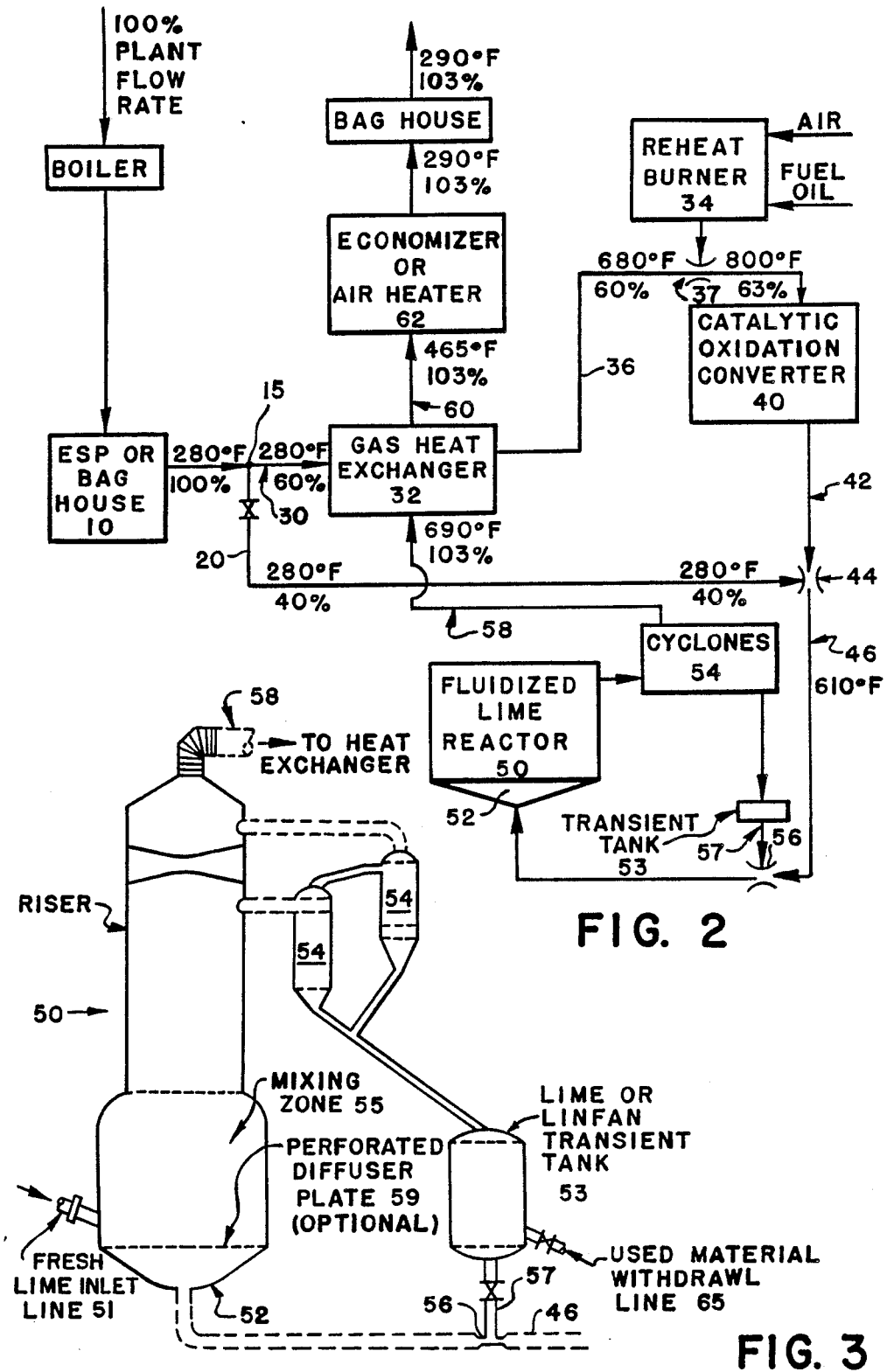
FIG. 2 illustrates my improved desulfurization process of the present invention.
FIG. 3 is an enlarged illustration of a portion of FIG. 2.

Because up to 100% of sulfur dioxide can be removed from flue gas while in the presence of sulfur trioxide, there is no need to convert sulfur dioxide more than is necessary in the catalytic converter. For reasons of economy, it follows that only a portion of the flue gas is preheated to the optimum conversion temperature and passed through the catalytic converter. FIG. 2 is an example of a flow diagram applicable for the retrofitting of a power plant burning 4% high sulfur coal. In this illustration, the catalyst $V_2O_5$ is used and the flue gas is heated to the optimum conversion temperature of about 800° F.

The advantages of my new improved desulfurization process and system are numerous. First, by directing only a fraction of the flue gas to the catalytic convertor, the size of the converter (and the associated capital costs) can be reduced. Second, because there is no need to preheat the bypassed gas stream, additional savings in fuels and/or other operating costs can be realized. Furthermore, the mixed gas that flows into the fluidized lime reactor will have a lower temperature than in previous systems wherein all the flue gas passes through the converter. Because the cooler gas will have a smaller volumetric flow rate, the improved desulfurization system will require a smaller fluidized lime reactor.

In short, the improved desulfurization process and system can reduce the overall capital investment and operating costs of the system while maintaining the same high $SO_x$ removal efficiencies and byproduct purity as in my prior desulfurization process.

Referring to FIG. 2 illustrating my improved desulfurization system for retrofitting a power plant burning 4% coal, solid particles in the flue gas from the boiler are first separated by a solids removal system 10. The flue gas cleaned of fly ash is then split into two streams at junction means 15, one stream in the circuit 30 and another stream in the bypass circuit 20. The flow in the bypass circuit 20 can be as high as 80% of the total flow, but preferably less than 50%. The flue gas in circuit 30 passes first through the gas heat exchanger 32 in order to extract heat, and results in a higher gas temperature in pipe line 36. The temperature of the flue gas in line 36 is further elevated to an optimum catalytic conversion temperature by mixing with heated gas from the reheat burner 34. The reheat burner can be an in-line burner or an off-line burner. In order to improve mixing, the hot gas from reheat burner 34 flows into line 36 through a venturi tube 37. The flue gas in pipe line 36 then passes through the catalytic oxidation converter 40 where a large fraction of sulfur dioxide is converted to sulfur trioxide.

The flue gas rich in sulfur trioxide in line 42 from convertor 40 is mixed with the gas in bypass circuit line 20 at the venturi tube or junction means 44. The mixed gas is then conveyed by line 46 to the windbox 52 where further mixing takes place. The well mixed gas, having sulfur dioxide and sulfur trioxide distributed uniformly and equilibrium established therein, flows through a distributor to react with lime particles in the fluidized lime reactor 50. The reactor can be either a bubbling fluidized bed or a circulating fluidized bed. For power plant applications, because the gas volumetric flow rate is high, a circulating fluidized lime reactor may be preferred. The chemical reactions between sulfur oxides and lime particles are very fast, and result in an almost complete removal of sulfur dioxide and sulfur trioxide via the chemical reactions, the mechanism of which has been explained previously.

In this illustration, a circulating fluidized lime reactor is utilized. The unique circulating fluidized lime reactor is further explained in detail in FIG. 3. The reactor has a mixing zone at the bottom. Depending on lime particle size distribution, the superficial gas velocity in the riser is in the range of 1 feet per second to 80 feet per second, and the residence time of the particles in the riser is in the range of ½ second to 10 seconds. The gas temperature of the reactor is maintained above the dew point of sulfuric acid, preferably above 500° F.

The solid particles in the gas from the top of the reactor 50 are separated by cyclones 54 and returned to the reactor 50 via a transient storage tank 53 and venturi section 56 of line 46. The venturi section 56 has a constricted section wherein gas velocity is high and pressure is low. The solid particles along with a small amount of gas in line 57 are sucked into the venturi section 56 and mixed with the gas in line 46. As the gas and solid mixture leaves the venturi tube, because of the increase of the line cross-sectional area, the gas expands and results in inducing turbulence and intimate contact between gas and solid particles. The chemical reactions in the flue gas occur and the gas and solids (lime containing material) contact will accelerate the chemical reaction between calcium oxide and sulfur trioxide. The solids and gas mixed flow enters windbox 52 at the bottom of reactor 50, and passes through the holes of the perforated diffuser plate 59. As the flow hits the blank portion of the plate, the stagnation pressure forces the flow to move to the holes and generate high turbulence, and hence promotes further molecular collisions between sulfur dioxide particles and the background molecules. Thus, the sulfur dioxide molecules are activated and this facilitates their oxidation to sulfur trioxide. After passing through the perforated diffuser plate 59, the gas and lime bearing material enters the mixing zone 55 where mixing is vigorously induced. The mixing zone has a larger cross-sectional area than the riser. The gas and solids mixture moves with high speed in the riser where further chemical reaction between lime and SOx takes place. The mixture leaves the reactor at the top of the riser and enters into cyclones 54 where gas and solids are separated. The treated gas from cyclones 54, cleansed of SOx and solid particles, is conveyed by line 58 to gas heat exchanger 32 for heat extraction.

The use of the perforated diffuser plate 59 in reactor 50 is optional. If the $SO_2/SO_x$ ratio of the flue gas just before entering the reactor is low, the average temperature of the mixing zone of the reactor is high, and there is a means to distribute uniformly the inflow gas across the reactor, the diffuser plate 59 can be omitted.

The fluidized lime reactor has a fresh lime inlet line 51, through which lime is added to reactor 50. The used or exhausted materials are withdrawn intermittently or continuously from transient tank 53 via line 65. The used material containing mainly anhydrous $CaSO_4$ can be used advantageously as a retarder in cement. In conventional cement production, gypsum ($CaSO_4 \cdot 2H_2O$) is used as a retarder. Gypsum and clinker are mixed and ground to form cement. During the grinding operation, waters in gypsum are released and bind the fine cement to form larger particles having low surface area to mass ratio. Therefore, the cement so produced will have low reactivity. When Linfan is used as a retarder for cement production, the anhydrous calcium sulfate coating of Linfan has no water to release during the grinding procedure and the cement so produced has finer particles and superior reactivity.

My improved desulfurization process is highly exothermic. As an example, for each percent of sulfur dioxide concentration in the flue gas, after passing through the catalytic converter and fluidized lime reactor, the temperature of the flue gas is increased by about 250° F. Therefore, the sensible heat of the gas in line 58 from reactor 50 is extracted in gas heat exchanger 32 by the cold gas from line 30. The remaining sensible heat in line 60 from heat exchanger 32 can be extracted optionally by economizer or air heater 62 before passing through a bag house and releasing to atmosphere through a stack.

It is known that in all other catalytic oxidation processes the reasons for employing a catalytic oxidation converter is to convert as much sulfur dioxide as possible to sulfur trioxide. In the present invention, only a fraction of the total flow passes through the converter while the rest is purposely and advantageously bypassed around the converter. The process and system is novel and the economic advantages are clear.

2. Duct Injection of $SO_3$ for Flue Gas Desulfurization

As explained previously, sulfur dioxide can be removed effectively from flue gas when sulfur trioxide is present in the gas, and sulfur trioxide can be injected into flue gas in order to meet this requirement.

Figure 4:
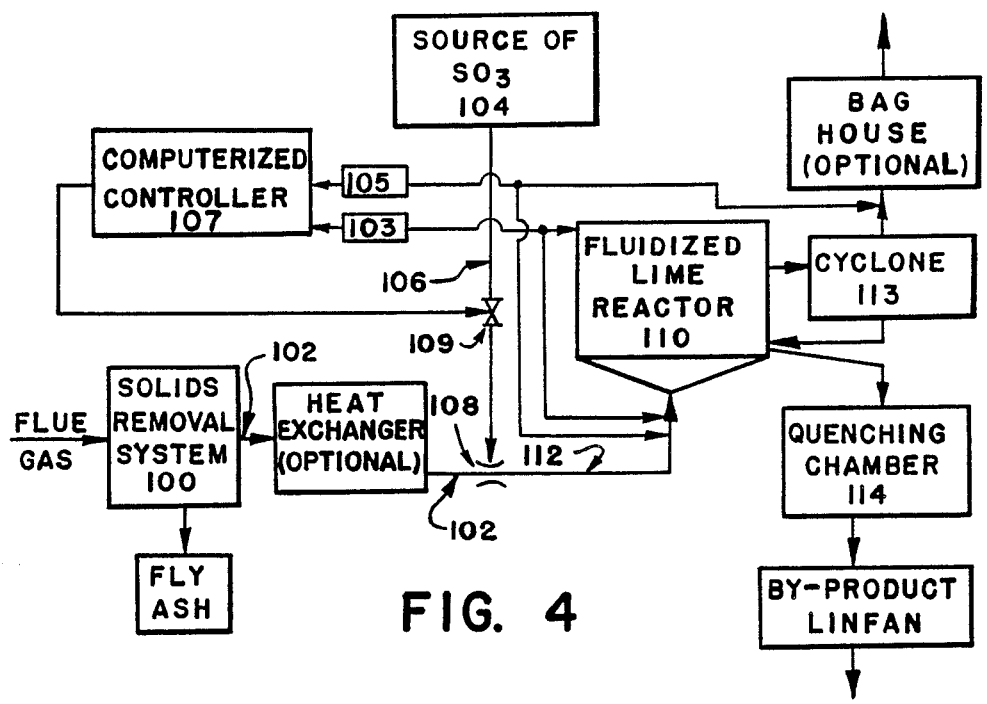
FIG. 4 is an illustration of an alternative method of the computerized improved desulfurization process.

FIG. 4 illustrates a system utilizing duct injection of sulfur trioxide into flue gas containing sulfur dioxide. As an example, the flue gas from a boiler containing 2000 parts per million of sulfur dioxide is first passed through a solids removal system 100. The solids removal efficiency of the system need not be very high because catalyst plugging is not a problem as a result of a catalytic oxidation converter not being used. The solids removal system can be a cyclone or electrostatic precipitator. The gas cleansed of fly ash by the solids removal system 100 and in line 102 mixes with gas rich in sulfur trioxide and received from sulfur trioxide source 104. The source of sulfur trioxide can be a sulfur trioxide rich gas cylinder, a sulfur trioxide rich gas tank car, solid sulfur trioxide (sulfane), oleums or liquid sulfur trioxide, or sulfur trioxide from heated sulfuric acid.

As an example, if the sulfur trioxide concentration in the gas from source 104 is 10 percent (100,000 ppm), and an $SO_2/SO_x$ ratio of 50 percent is used for the mixed flue gas in line 112, the volumetric flow rate for gas in line 106 is only 2 percent of the flue gas received from the boiler via line 102. Therefore, the increase in the flow rate through the fluidized lime reactor 110 is very small. The gas rich in sulfur trioxide contained in line 106 is drawn into line 102 by venturi section or junction means 108 for better mixing. In order to avoid the condensation of sulfur trioxide and the formation of sulfuric acid, the temperatures of the gases in lines 106 and 112 must be maintained above the dew point of hydrogen sulfate.

The amount of $SO_3$ injected into flue gas can be regulated by process control. After a period of $SO_3$ duct injection, the temperature of the lime-bearing particles in the reactor reaches a high level (below dissociate temperature of $CaSO_4$) and the $SO_2$ removal efficiency of the system becomes very high. When this happens, the volumetric flow rate of the injected $SO_3$-rich gas can then be reduced to a low level or even to zero-level, because the high temperature of the lime-bearing particles will induce the autogeneous chemical conversion of $SO_2$ to $SO_3$, and because of that the heat released from the exothermic reaction between the newly formed $SO_3$ and lime can maintain the lime-bearing particles at a high temperature level, and maintain the established temperature and $SO_x$ concentration gradients in the particles and the gas surrounding the particles, without which $SO_2$ conversion to $SO_3$, gas diffusion and convective turbulence are not possible. When $SO_2$ concentration is high in the influent gas of the reactor, and the temperature of the gas is high in the reactor, the initial $SO_3$ duct injection serves the purpose of raising the temperature of the lime bearing particles and inducing the autogeneous conversion of $SO_2$ to $SO_3$. Once the autogeneous reactions take place, the $SO_3$ duct injection can be stopped.

The drop of reactor gas temperature and an increase in $SO_2$ concentration in the reactor exit gas are the indications that the autogeneous reaction is tapering off. When this happens, fresh lime (or Linfan) and a larger $SO_3$ mass flow rate are required to be injected to the reactor and duct, respectively. In order to reduce the amount of $SO_3$ duct injection to a minimum, and for an effective use of lime and to maximize the $SO_x$ removal efficiency of the system, the $SO_3$ duct injection can be controlled by a computerized controller which has been incorporated in FIG. 4. In FIG. 4, the temperature probes 103 are used for line 112 and reactor 110, and the $SO_2$ concentration probes 105 for line 112 and exit gas from the reactor, and they send constantly signals to the computerized controller 107 which in turn adjusts the opening of the control valve 109 in line 106 for regulating the flow rate of the gas containing $SO_3$ into flue gas in line 112, so that the sulfur dioxide removal efficiency of the system does not fall to a predetermined level. The information from temperature probes 103 and $SO_2$ concentration probes 105 can be used for mass balance and heat balance programmed calculations. From mass balance and heat balance of the system, it is possible to find, by programming, the average temperature of the lime-bearing particles in the reactor, which can also be used as a means for regulating by means of control valve 109, the flow rate of the gas containing $SO_3$ into flue gas line 112.

Lime from a lime storage mechanism (not shown) is added to the reactor 110 and the chemical product is withdrawn either intermittently or continuously. The chemical product from the reaction between sulfur trioxide and lime is quenched in a quenching chamber 114 in order to form the resulting product "Linfan", a solid particulate material having lime in the core surrounded by a cracked calcium sulfate coating. Linfan can be used for reclaiming fly ash for a high strength construction material, as a substitute for cement in concrete construction, for acid neutralization and heavy metal removal in wastewater treatment, for soil conditioning, for road pavement and base construction, etc.

The gas from the fluidized lime reactor then passes through cyclone 113 where solid particles are separated from the gas and returned to the reactor 110. The treated gas from cyclone 113 can be either released directly to atmosphere or further treated by a bag house (which is optional) for solids removal before releasing to atmosphere.

This system can be utilized for treating flue gas of low sulfur dioxide concentration such as that produced in a power plant. It must be pointed out that because sulfur trioxide is drawn into the system from an outside source of sulfur trioxide, the Linfan production from this system will be much higher. Therefore, if Linfan production is the primary objective, such a system is ideal. The fluidized lime reactor can be a bubbling bed or circulating bed. When Linfan production is stressed, a bubbling bed is recommended. By using sulfur trioxide directly from a sulfur trioxide cylinder, the capital investment in a catalytic oxidation converter is eliminated. Further, the efficiency of solids removal system 100 is not of such great importance. All this contributes to a reduction in capital investment and operating costs.

2A. Alternative Method for Duct Injection of $SO_3$ for Flue Gas Desulfurization Sulfur trioxide can be injected at a point between the furnace and the solids removal system 100, when limestone injection-to-furnace processes for sulfur dioxide removal are employed. The efficiencies of $SO_x$ removal by these limestone injection-to-furnace processes are low, and the Ca/S ratio employed is high.

The capture of $SO_2$ by lime is effective between 2300° F. and 1600° F. It is known that after leaving the furnace, the flue gas is rapidly cooled and the lime has a very short period of time to react with sulfur oxides. By injection of $SO_3$ into a gas zone having a temperature of about 1800° F., the exothermic reaction between $SO_3$ and lime-bearing particles tends to maintain the particles at their optimum $SO_x$ removal temperature, although the flue gas is flowing rapidly from the furnace and the surrounding gas is cooled at a fast rate.

By using my duct injection of $SO_3$ method at a suitable point, either in the furnace or in the duct between the furnace and the solids removal systems 100, the temperature of the lime-bearing particles can be maintained at optimum level for $SO_x$ removal, even though the temperature of the surrounding gas cools considerably. As a result, additional $SO_x$ is removed and more lime materials are utilized. Therefore, the over-all sulfur dioxide removal and lime material utilization efficiencies will be improved. The resulting products of desulfurization and fly ash are to be separated from the flue gas by a solids removal system. If only moderate $SO_x$ removal from the flue gas is desired, no fluidized lime reactor and $SO_3$ duct injection are needed for treating the gas at the downstream side of the solids removal system 100.

3. Production of Sulfur Trioxide from Sulfur Dioxide for In-duct Injection

Figure 5:
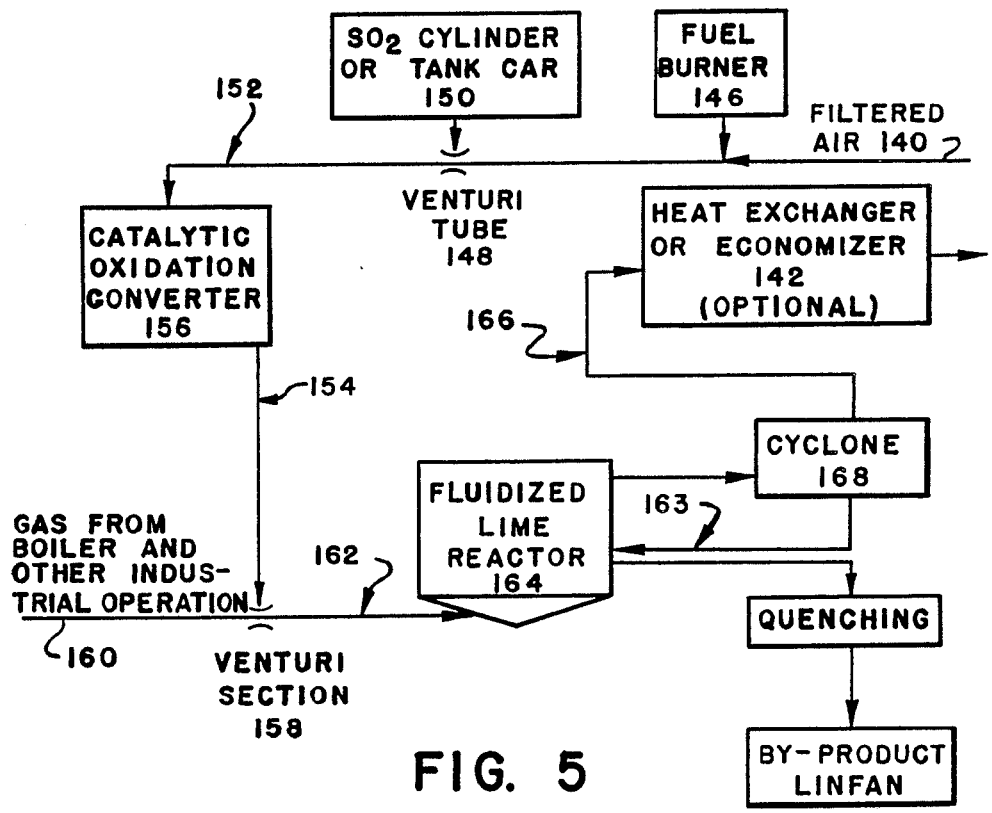
FIG. 5 illustrates an alternative method of providing sulfur trioxide for the process of FIG. 4.

Sulfur trioxide for in-duct injection can be produced from sulfur dioxide by catalytic conversion. FIG. 5 illustrates a flow diagram designed for this purpose. In this system, the filtered air 140 is heated to a temperature of about 800° F. by the hot gas from a burner 146 or by means of heat exchanger (not shown). The hot filtered air then passes through a venturi tube 148 in line 152 where the sulfur dioxide gas is drawn from a sulfur dioxide cylinder or tank car 150 and mixed with the hot filtered air to the desired sulfur dioxide concentration. The mixed gas then passes through the catalytic oxidation converter 156 for the conversion of sulfur dioxide to sulfur trioxide. The gas rich in sulfur trioxide in line 154 mixes with the gas from boiler 160 at venturi section 158, at points before or after a solids removal system(cyclones or electro-static precipitator, not show). The reason for injecting $SO_3$ into flue gas before the solids removal system is to utilize the lime in high-lime-bearing fly ash for $SO_x$ removal. When fly ash contains a large amount of lime, $SO_3$ injection before the solids removal system can serve as an additional treatment. The mixed gas in line 162 flows through the fluidized lime reactor 164 for effective $SO_x$ (sulfur dioxide and sulfur trioxide) removal. The exiting gas from reactor 164 passes through a cyclone 168 where solid particles are separated from the gas and returned to the reactor 164 by line 163. The clean gas from cyclone 168 is carried by line 166 and flows through the gas heat exchanger or economizer 142 (which is optional) for heat extraction. The used solid material from the reactor 164 is quenched for Linfan production.

It must be pointed out that the gas mass flow rate through the catalytic convertor 156 is only a fraction of that from the boiler. Because the mass flow rate through the convertor 156 is low, coupled with the fact that the gas is free from solids, both the capital and maintenance costs for the convertor are considerably lower. Further, the production of Linfan will also be increased. If production of Linfan is the primary objective, this system is ideal.

4. Improved Desulfurization of Gas with Variable Volumetric Flow Rate and Sulfur Dioxide Concentration In many industrial applications, the volumetric flow rate and sulfur dioxide concentration varies with time. For example, the gas stream from a converter in a copper smelting plant varies not only in volumetric flow rate, but also in sulfur dioxide concentration. Because in my desulfurization process the reactions in the fluidized lime reactor are effective for a wide range of SOx concentration and $SO_2/SO_x$ ratio, the conversion efficiency of sulfur dioxide to sulfur trioxide in the process is not critical. Therefore, a portion of the gas can be by-passed from the catalytic converter. Because of the bypass line feature of my improved desulfurization process, the problems associated with variability of gas flow rate and sulfur dioxide concentration can be solved.

Figure 6:
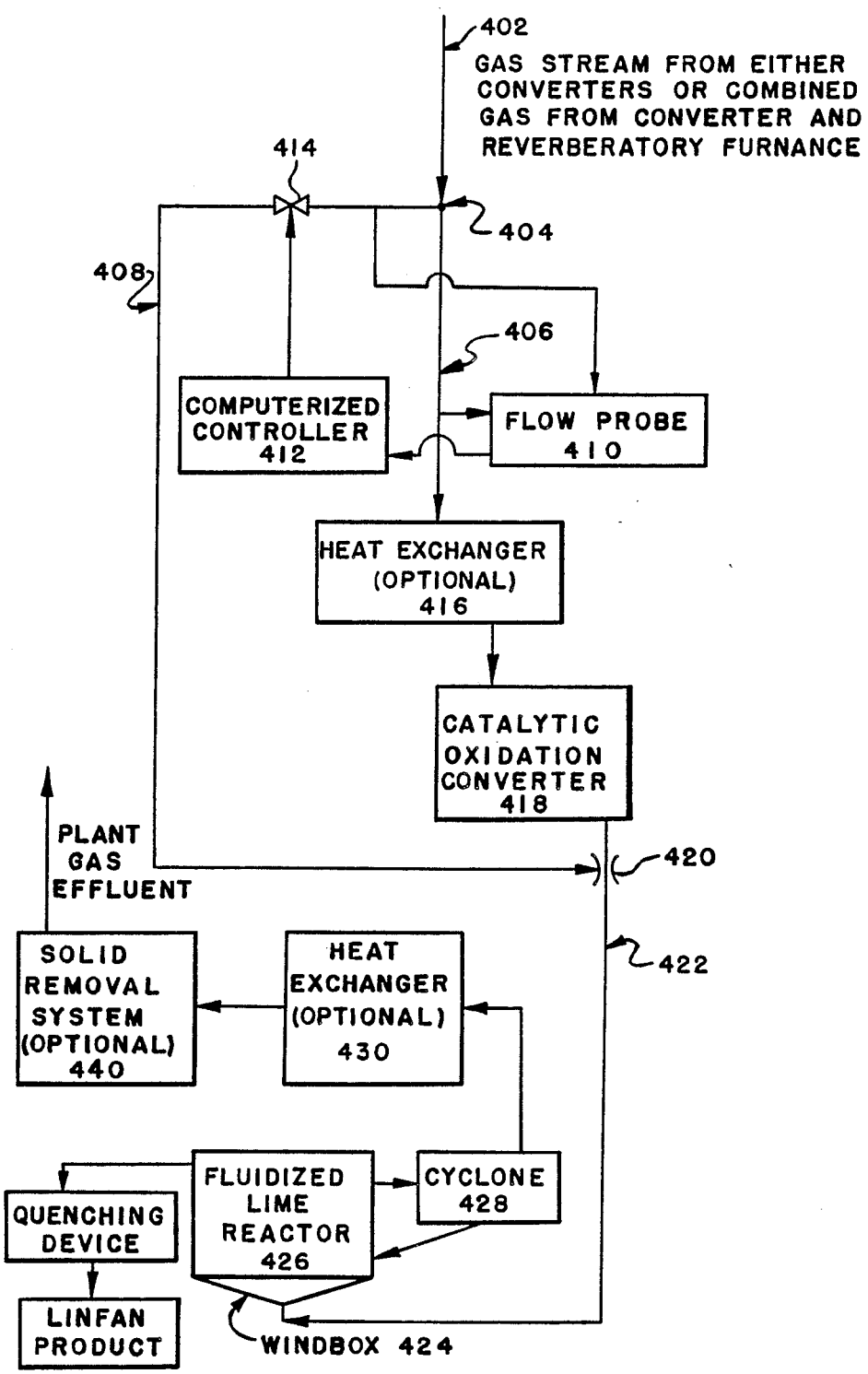
FIG. 6 illustrates the computerized control of an improved desulfurization process of the present invention.

FIG. 6 illustrates an example of the desulfurization of emissions from a smelter plant. Line 402 carries a gas stream from either converters only or the combined gas from converters and a reverberatory furnace. After the gas passes through a solids removal system (not shown), the gas splits at junction 404 into two streams or circuits in lines 406 and 408. The maximum gas flow rate in line 406 is predetermined in the design of the system. The flow rate probe 410 for line 406 sends constantly a signal to the computerized controller 412 which in turns adjusts the opening of the damper or control valve 414 in the bypass line or circuit 408 so that the flow rate in line 406 can be maintained within a predetermined range and not exceed the predetermined value.

The gas in line 406 then flows through a heat exchanger 416 (which is optional, depending on the gas temperature and type of the catalyst used) for adjusting the temperature of the gas to an optimum temperature for catalytic conversion. The catalytic converter 418 can be a fixed or fluidized bed, and the catalyst used in the converter can be vanadium pentoxide, ferric oxide or other suitable catalysts. It is known that pyrites (iron oxide) at 600° C. serve not only to remove arsenical, and so on, impurities, but also to effect the conversion of more than half of the sulfur dioxide to sulfur trioxide. Because the conversion efficiency is not critical in my desulfurization system, for economic reasons the catalytic converter can be a single staged converter using either vanadium pentoxide, ferric oxide or other catalysts for catalytic conversion from sulfur dioxide to sulfur trioxide.

Although the flow rate in the bypass line 408 varies with time, the variation does not affect the operation of the catalytic converter 418. The gas in the bypass line 408 and the gas from the catalytic converter are joined and mixed at a venturi tube 420. The $SO_2/SO_x$ ratio of the mixed gas in line 422 is lower than 80 percent, preferably lower than 50 percent. The maximum design $SO_2/SO_x$ ratio in line 422 is also a factor to be considered in the selection of the flow rate range in line 406.

The advantages of using a bypass flow include that the catalytic converter 418 can be designed for the minimum flow necessary for effective sulfur dioxide removal. In a plant which releases a variable volumetric flow, by using a bypass line it is not necessary to design the converter for a maximum total flow rate, and thus this results in a considerable savings in capital investment and operating costs. Furthermore, when the gas in line 406 is maintained at nearly a constant flow rate, the gas transmitted to gas heat exchanger 416 can be economically designed and controlled to meet the thermal requirement of the catalytic converter 418.

The mixed gas in line 422 enters windbox 424 of the fluidized lime reactor 426. Further mixing will be achieved in the windbox so that the sulfur dioxide and sulfur trioxide are uniformly distributed. The fluidized bed can be a bubbling bed or circulating bed. When the circulating bed is used, a cyclone or a series of cyclones 428 are used to separate the solid particles from the gas stream and return them to the reactor. For Linfan production, a bubbling bed is recommended. The exit gas from cyclone system 428 passes through heat exchanger 430 (optional) and a solids removal system 440 (optional) before being released to atmosphere.

In treating gas from a metal smelting plant having high sulfur dioxide concentration, the heat released from the chemical reactions in my desulfurization process is high. The heat can be employed for calcination of limestone for lime production. Therefore, limestone or a mixture of lime and limestone can be used as reactants for desulfurization in the fluidized reactor.

The fluidized reactor can be operated on a continuous basis or on a batch process. When it is operated on a batch basis, two reactors can be used for continuous operation, and then the system is more flexible in operation.

5. Improved Desulfurization of Gas by Injection of Heated Lime or Linfan Directly into the Fluidized Reactor From the reaction mechanism explained previously, it is apparent that as long as the lime-bearing particles are maintained at high temperatures, the $SO_2$ in the gas surrounding the hot particles can be rapidly converted to $SO_3$ which in turn is removed by the reaction with lime in the lime-bearing particle. It follows that desulfurization can also be achieved by the injection of hot lime-bearing particles into the reactor. The lime-bearing particles are heated to a high temperature below 2000° F. and then injected into the fluidized reactor. In this case, sulfur dioxide in the flue gas is effectively removed by the hot lime-bearing particles without the injection of sulfur trioxide.

The lime-bearing particles are heated in a heating unit either inside of the reactor or outside of the reactor. Heating can be done by an electric furnace (arc or induction types), or by gas, oil, coal, etc. The heated lime-bearing particles are injected into the reactor either by pneumatic means or by mechanical means.

An alternative method for producing the hot lime-bearing particles is directly from limestone. For a large power plant or industrial plant, it might be cheaper to produce lime from limestone in the plant for the desulfurization purpose. Limestone is ground to the desired gradation first and then fed into a kiln such as a rotary kiln, a fluo-solid kiln, etc. in which the applied heat causes the limestone particles to dissociate into $CO_2$ and CaO (lime). The hot lime particles are withdrawn from the kiln and injected immediately into the reactor for desulfurization.

In order to maintain the temperature of the injected lime-bearing particles at a high level, the temperature of the gas environment in the reactor should not be low, it should be preferably above 600° F. The method is preferably for treating flue gas having high $SO_x$ concentration. If the temperature of the gas and the $SO_x$ concentration in the gas is too low, the heat loss from the solid lime-bearing particles can be excessive, and the heat generated from the autogeneous and exothermic reactions is not sufficient to compensate the heat loss, resulting in lowering the solid particle temperature and causing ineffectiveness in $SO_x$ removal from the flue gas. When that happens, the relatively cold particles should be withdrawn from the reactor and replaced by fresh hot lime-bearing particles, or they are reheated in the reactor by the exothermic reactions from the injected gas-rich in $SO_3$. The process can be controlled by a computerized controller.

I have developed the chemical reaction mechanism of my improved desulfurization process, solved the problem of removing sulfur dioxide in flue gas that causes acid rains, and satisfied the long-standing need for a commercially acceptable system for air pollutant control and disposal. My improved process and system is not to be construed as limited to the particular form described herein, because these are to be regarded as illustrative rather than restrictive. For example, the improved process can also be used to remove sulfur dioxide from gas emissions of industrial boilers, petroleum refineries, sulfuric acid plants, natural gas-treating plants, pulping industries, coking plants of the steel industry, and metal (copper, zinc, lead, etc.) smelters in the metal industry. Catalysts other than vanadium pentoxide and ferric oxide can also be employed for catalytic oxidation conversion. Limestone can substitute lime for the desulfurization of gas high in sulfur dioxide. Duct injection of $SO_3$ can be also employed in other desulfurization processes such as a fluidized combustion process for improving SOx removal efficiency and for the reduction of the temperature of a fluidized combustion chamber. It can also be employed for improving the performance for a LIMB (limestone injection in multistage burner) process, spray dryer and other duct injection processes. With the understanding of the desulfurization mechanism, the applications of my process are unlimited.

It is reasonable to expect that those skilled in this art can make numerous revisions and adaptations of the invention and it is intended that such revisions and adaptations will be included within the scope of the following claims as equivalents of the invention.

What is claimed is:

1. An improved process for effecting the efficient desulfurization of gases containing sulfur oxides, comprising the steps of:
    transmitting flue gas containing sulfur oxides gases through junction means which receives a gas containing sulfur trioxide that is mixed at the junction means with the flue gas containing sulfur oxides gases,
    passing the mixed gases to a reactor and providing a calcium containing reactant to the reactor,
    withdrawing the reaction product of the reactant and sulfur oxides,
    quenching said reaction product to effect a porous core of unreacted reactant in an outer shell and to induce cracks in the outer shells,
    continuously emitting a desulfurized exit gas from said reactor, and
    transmitting said desulfurized exit gas to an exit.

2. The process for effecting efficient desulfurization in accordance with claim 1, further comprising the step of passing the flue gas containing sulfur oxide gases through solids removal means in order to remove solids therefrom.

3. The process for effecting efficient desulfurization in accordance with claim 1, further comprising the step of providing computerized controller means which receives temperature and sulfur dioxide concentration data from points before and after the reaction and which effectively controls the flow rate of the sulfur trioxide gas at said junction.

4. The process for effecting efficient desulfurization in accordance with claim 1, further comprising the steps of providing the gas containing sulfur trioxide by means of mixing air with sulfur dioxide to provide a sulfur dioxide containing gas, transmitting the so produced sulfur dioxide gas to catalytic converter means in order to convert the sulfur dioxide therein to sulfur trioxide, and transmitting the sulfur trioxide gas to said junction means.

5. The process for effecting efficient desulfurization in accordance with claim 1, further comprising the step of transmitting the gases from the solids removal means through heat exchanging means prior to said gases being transmitted to the junction means.

6. An improved process for effecting the efficient desulfurization of gases containing sulfur oxides, comprising the steps of:
    passing a flow of flue gas containing sulfur oxides gases to solids removal means in order to remove solids therefrom,
    transmitting the flue gas to junction means where a portion of the flue gas continues through a first circuit and a remaining portion of the flue gas passes through a second circuit,
    transmitting the flue gas in the first circuit through heat exchanging means in order to increase the temperature thereof,
    passing the heated flue gas in the first circuit through catalytic converter means in order to convert the sulfur dioxide therein to sulfur trioxide and resulting in a sulfur trioxide rich flue gas,
    communicating the flue gas in the second circuit means to second junction means located downstream the catalytic converter means wherein the flue gas is joined with the sulfur trioxide rich flue gas from the converter means to provide a mixed flue gas,
    communicating the mixed flue gas to a reactor and providing a calcium containing reactant to the reactor,
    continuously emitting a desulfurized exit gas from the reactor to solids separation means, and
    transmitting said desulfurized exit gas to an exit.

7. The process for effecting the efficient desulfurization in accordance with claim 6, further comprising the steps of communicating material separated in the separation means to an input line of the reactor which receives the mixed flue gas, and commingling the separated material with the mixed flue gas which enters the reactor.

8. The process for effecting the efficient desulfurization in accordance with claim 6, further comprising the step of transmitting the exit gas from the reactor to the heat exchanging means prior to the separation means.

9. The process for effecting the efficient desulfurization in accordance with claim 8, further comprising the step of transmitting the flue gas in the first circuit through temperature increasing means before the flue gas reaches the catalytic convertor means.

10. The process for effecting the efficient desulfurization in accordance with claim 7, further comprising the step of transmitting the exit gas through second heat exchanging means.

11. The process for effecting the efficient desulfurization in accordance with claim 10, further comprising the step of the reaction product of the mixed flue gas and reactant being utilized as a retarder for cement production.

12. An improved process for effecting the efficient desulfurization of gases containing sulfur oxides, comprising the steps of:
  passing a flow of flue gas containing sulfur oxides gases to solids removal means in order to remove solids therefrom,
  transmitting the flue gas to junction means where a portion of the flue gas continues through a first circuit and a remaining portion of the flue gas passes through a second circuit,
  passing the flue gas in the first circuit through catalytic converter means in order to convert the sulfur dioxide therein to sulfur trioxide and resulting in a sulfur trioxide rich flue gas,
  communicating the flue gas in the second circuit means to second junction means located downstream of the catalytic converter means wherein the flue gas is joined with the sulfur trioxide rich flue gas from the converter means to provide a mixed flue gas,
  communicating the mixed flue gas to a reactor and providing a calcium containing reactant to the reactor,
  continuously emitting a desulfurized exit gas from the reactor to separation means, and
  transmitting said desulfurized exit gas to an exit.

13. The process for effecting the efficient desulfurization in accordance with claim 12, further comprising the step of providing computerized controller means which receives flow rate data from said first and second circuits and effectively controls the amount of flue gas diverted into said second circuit.

14. The process for effecting the efficient desulfurization in accordance with claim 13, further comprising the steps of withdrawing the reaction product of the reactant and mixed flue gas, and quenching said reaction product to effect a porous core of unreacted reactant in an cracked outer shell.

15. The process for effecting the efficient desulfurization in accordance with claim 14, wherein the reactant provided to the reactor comprises a lime bearing material, and the cracked outer shell comprises an outer shell of cracked calcium sulfate.

16. The process for effecting the efficient desulfurization in accordance with claim 13, further comprising the step of transmitting the flue gas in the first circuit through heat exchanging means in order to increase the temperature thereof.

17. An improved process for effecting the efficient desulfurization of gases containing sulfur oxides, comprising the steps of:
  transmitting flue gas containing sulfur oxides gases to reactor means,
  heating lime-bearing particles to a high temperature of less than 2000° F.
  injecting the high temperature lime-bearing particles into the flue gas in the reactor means in order to effect a reaction product,
  withdrawing the reaction product of the lime-bearing particles and sulfur oxides, and
  emitting a desulfurized exit gas from the reactor.

18. The process for effecting efficient desulfurization in accordance with claim 17, further comprising the step of controlling the process by means of computerized controller means.

19. The process for effecting efficient desulfurization in accordance with claim 17, wherein the temperature of the flue gas is preferably above 600° F.

* * * * *

UNITED STATES PATENT AND TRADEMARK OFFICE
CERTIFICATE OF CORRECTION

PATENT NO. : 4,975,257

DATED : December 4, 1990

INVENTOR(S) : Ping-Wha Lin

It is certified that error appears in the above-identified patent and that said Letters Patent is hereby corrected as shown below:

COLUMN 2, LINE 47, DELETE "-9.26" AND INSERT --92.6--.

Signed and Sealed this

Nineteenth Day of May, 1992

Attest:

DOUGLAS B. COMER

Attesting Officer

Acting Commissioner of Patents and Trademarks